US009697478B2

(12) United States Patent
Hueter et al.

(10) Patent No.: US 9,697,478 B2
(45) Date of Patent: Jul. 4, 2017

(54) SYSTEM AND METHOD FOR GENERATING AUTOMATED SELF-OPTIMIZING TARGETED E-MAILS

(75) Inventors: Geoffrey J. Hueter, San Diego, CA (US); Steven C. Quandt, Encinitas, CA (US); Noble H. Hueter, San Diego, CA (US); Christopher J. Bryant, Solana Beach, CA (US)

(73) Assignee: CERTONA CORPORATION, San Diego, CA (US)

( * ) Notice: Subject to any disclaimer, the term of this patent is extended or adjusted under 35 U.S.C. 154(b) by 1313 days.

(21) Appl. No.: 12/416,388

(22) Filed: Apr. 1, 2009

(65) Prior Publication Data

US 2009/0248523 A1 Oct. 1, 2009

Related U.S. Application Data

(60) Provisional application No. 61/041,447, filed on Apr. 1, 2008.

(51) Int. Cl.
| | |
|---|---|
| *G06Q 30/00* | (2012.01) |
| *G06Q 10/00* | (2012.01) |
| *H04L 12/58* | (2006.01) |
| *G06N 99/00* | (2010.01) |
| *G06Q 30/02* | (2012.01) |
| *G06Q 30/06* | (2012.01) |

(52) U.S. Cl.
CPC ......... *G06Q 10/00* (2013.01); *G06N 99/005* (2013.01); *G06Q 30/00* (2013.01); *G06Q 30/0185* (2013.01); *G06Q 30/0201* (2013.01); *G06Q 30/0202* (2013.01); *G06Q 30/0255* (2013.01); *G06Q 30/0269* (2013.01); *G06Q 30/0631* (2013.01); *H04L 12/585* (2013.01)

(58) Field of Classification Search
USPC .......................................... 705/14
See application file for complete search history.

(56) References Cited

U.S. PATENT DOCUMENTS

| | | | |
|---|---|---|---|
| 2003/0229537 A1* | 12/2003 | Dunning et al. ................ 705/10 |
| 2005/0222906 A1* | 10/2005 | Chen .............................. 705/14 |
| 2008/0177600 A1* | 7/2008 | McCarthy et al. ............... 705/7 |
| 2009/0198556 A1* | 8/2009 | Selinger et al. ................ 705/10 |
| 2009/0228340 A1* | 9/2009 | Bohannon ...................... 705/10 |
| 2013/0185149 A1* | 7/2013 | Koningstein et al. ..... 705/14.49 |

* cited by examiner

*Primary Examiner* — Alvin L Brown
(74) *Attorney, Agent, or Firm* — Richard D. Clarke

(57) ABSTRACT

A system and method is disclosed for generating targeted e-mails based on individual subject behavior and interests, as determined by an application's website browsing behavior, online and offline purchases, ratings, and other implicit and explicit indications of subject preferences and interests. The subject's behavior data is collected directly from the subject's client browser or from the application's own information and used to generate profiles of the subjects that will be sent e-mails and the objects that will be recommended. Targeted content is generated by matching subject and object profiles in combination with any subject segmentation filters that the application provides. The e-mail targeting is optimized by measuring subject response to targeted e-mails and adjusting recommendation strategies used to generate subsequent recommendations. The system has application in personalization, behavioral targeting, Internet retailing, affiliate marketing, and online advertising, to name but a few applications.

23 Claims, 5 Drawing Sheets

SYSTEM AND METHOD FOR GENERATING AUTOMATED SELF-OPTIMIZING TARGETED E-MAILS

FIELD OF THE INVENTION

The present invention relates to electronically marketing goods, services, content, and other entities through the automated analysis of human behavior. Particularly, the invention relates to the representation of subject and object characteristics for purposes of efficient generation of recommendations, cross marketing between product, service, and content categories, and personalizing electronic mail based on matching subject and object profiles. The system has application in personalization, behavioral targeting, Internet retailing, affiliate marketing, and online advertising, to name but a few applications.

BACKGROUND OF THE INVENTION

The consumer faces a profound number of possible choices when selecting most kinds of products, be it movies, music, books, travel, art, dining, employers, and so on, to the extent that the consumer must choose from well-publicized possibilities, such as through advertising, or rely on recommendations of others. In the first case the set of choices is severely limited to those that can be promoted to a broad audience. In the second case the consumer must weigh the similarity of his or her own tastes to the person making the recommendation, whether it be an acquaintance or media. In addition, the number of possibilities and the cost of acquisition, both in terms of time and money, of assessing possibilities, make it infeasible to sample a large number of possibilities to determine which are of interest to the consumer.

Recommendation systems rely on trying to best match a person's individual preferences to the characteristics of the available items. In general what is known about the subjects and objects is the set of affinities between subjects and objects, where the affinity $\{A_{ij}\}$ between subject i and object j is determined by explicit feedback from the subject or inferred from the subject's interaction (or non-interaction) with the object. The consistency of the affinity scale from subject to subject and object to object derives from the consistency of the goal of the subjects in the given environment, for example to make a purchase in a commerce environment or to read articles in a content environment.

The primary goal of the recommendation system is to predict for a given subject those objects for which the subject will have the greatest affinity. In general the subject characteristics can be represented by a vector $S=(S_1, S_2, \ldots, S_L)$ and the object characteristics can be represented by a vector $B=(B_1, B_2, \ldots, B_M)$, whereby the predicted affinity of the subject to the object is a function $P=f(S, B)$. Various recommendation systems then differ in their representation of subject and object characteristics S and B and the similarity function f.

One method that has been used, commonly referred to as collaborative filtering, is to represent the subject as the set of object ratings that the subject has provided; i.e., $S=\{R_1, R_2, \ldots, R_L\}$, where $R_i$ is the subject's rating of object i. In most scenarios where recommendations are of use, the number of available items (e.g., such as catalog size) is going to be much larger than the number of items that have been rated by the subject, and so the set S is sparse. To generate a recommendation of a particular object to a particular subject, the subject's profile is compared to the profiles of other subjects that have rated the object. Given the similarities and dissimilarities of objects that have been rated in common, an estimate of the subject's response is generated. In a recommendation system, the system would generate estimates for a variety of objects rated by similar people and return as recommendations the objects with the highest predicted ratings.

Effectively, this type of system is a "mentored" system, whereby each subject is matched to a set of other subjects with similar tastes that have rated objects that the subject has not rated. This approach has several drawbacks, which include: recommendations can only be made where the subject's small set of mentors have provided coverage; the method is dependent on a class of users that have provided a large number of ratings (i.e., mentors), or else the system database must be searched to provide mentors appropriate to each requested object; the method is limited in capacity to make recommendations across various categories (cross marketing); the method does not make full use of all data for each subject (that is, the method is restricted to the subset of mentors); the representation of the subject, which is the set of ratings for each rated object, is not compact and increases linearly with the number of rated objects; subject representations are not portable to other recommendation systems; requires lengthy questionnaires to introduce a new subject into the system; and faces combinatorial challenges to find the best mentor for a given user and is therefore not scalable to large user populations.

Additional desired characteristics of a recommendation system that cannot be addressed by the mentor method include inverse modeling of subject representations back to physical attributes, such as demographics or psychographics, and identification and representation of object similarities.

Another approach is shopping basket analysis, which makes suggestions based on objects that have been purchased by other subjects at the same time as an object that has been selected by the targeted subject. However, this approach relies on transactional dependency and does not allow prediction of preference for objects that are not purchased together. In particular this method cannot associate subject/object affinities across catalog or across time as catalog items are replaced by similar items. Shopping basket analysis is also not specific to individual subjects, but rather to aggregate transaction histories across all subjects. By contrast, the present invention automatically normalizes all product profiles across product categories and can combine information across single vendor transaction histories.

Other approaches classify objects according to expert defined categories or attributes, whereby each object is rated by each attribute and then recommendations are made by matching the expressed interests of the subject to the attributes of the objects. Expert systems have the drawback that they are not self-adapting; that is, they require expert classification or coding. This means that such systems are specific to a single product domain. Also, because they are not data driven, they are not able to process large, diverse, and constantly changing transaction histories.

Predictive modeling techniques use demographics to model subjects. Not only are demographics an indirect substitute for aesthetic opinions and therefore inherently inaccurate, this is invasive of the subject's privacy and only specific to groups of subjects and not to individual subjects.

SUMMARY OF THE INVENTION

In accordance with the present invention, a method and system is presented for collecting subjects' affinities to objects, extracting subject and object profiles, and generating recommendations to subjects of objects that were rated by other subjects. This invention is sometimes referred to in this patent by its commercial trademarked name, Resonance®.

An object of the invention is to provide a means of recommending objects to subjects based on either explicit or behaviorally inferred ratings of other subjects of those objects and of commonly rated objects.

Another object of the invention is to compactly and uniformly represent subject and object profiles so that the affinity, or preference, of the subject to the object can be quickly and efficiently predicted, and so that the number of features in the profiles of the subjects and objects is not directly dependent on the number of subjects or objects in the system.

Another object of the invention is to create a representation of objects that is universal across all types of objects, so that all types of objects can be compared to one another and the subject's interaction with one set of objects can be extrapolated to other types of objects, and that the representation is derived solely from the collective interaction of subjects with the set of objects (catalog) and does not require detailed object information or expert knowledge of object characteristics.

Another object of the invention is to enable the use of all subject-object interactions, and not just, for example, purchase behavior, to form profiles of subject and objects for faster profiling and greater accuracy and responsiveness to temporal changes in site merchandising or customer behavior.

Another object of the invention is to create object profiles as well as subject profiles, so that objects can be readily indexed by aesthetic or other categories and so that objects can be readily associated across product categories by aesthetic similarity.

Another object of the invention is to create subject and object profiles that can be used to relate the derived aesthetic attributes to other objective measures of subjects, such as personality type or demographics, and objects, such as color or shape.

Another object of the invention is to collect ratings information from multiple applications while protecting the anonymity of the subject across different applications and minimizing the need to normalize object information (metadata) across catalogs.

Another object of the invention is to combine the recommendations of the system with explicit human merchandising objectives either through "hard" rules that filter results by specified criteria or "soft" rules that bias the results towards a defined business goal.

Another object of the invention is to provide recommendations to groups of subjects based on the best match to their collective profiles.

Another object of the invention is to enhance product and content marketing by characterizing the attributes of object profiles.

Another object of the invention is to identify appropriate subjects for the marketing of a particular object.

The present invention is a system and method for predicting subject responses to objects based on other subjects' responses to that and other objects. The process of matching subject and object profiles produces a predicted response score that can be used to rank recommended content. The scores can be used as is or combined with other business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that retailers "push" potentially unwanted products through advertising or other inefficient means.

The invention also addresses the issue of consumer privacy because it does not profile the consumer using personal demographics information, which consumers find both invasive and tedious to enter. Thus Resonance improves retailers' ability to target customers, while simultaneously making it easier for consumers to participate.

The invention works by forming profiles of subjects, for example consumers, and objects, such as goods or media, based on aesthetic evaluations of objects by subjects. The invention does not require a prior information about either subjects, such as demographics or psychographics, or objects, such as classifications or genres. Rather, it automatically generates representations of subjects and objects solely from the subjects' interaction with the objects. Because it creates its own abstract representation of subjects, it allows retailers to transparently target the subject without compromising subject privacy through the collection and modeling of sensitive personal information. The profiles can also be extended across catalogs, product or content domains, or across websites or stores.

Note that the identification of subjects and objects is not a physical one and may change depending on the application. For example, in a consumer movie recommendation application, the person requesting recommendations is the subject and the movie is the object. In a dating service application, a person would be considered a subject when searching for matches and an object when being searched by others. Similarly, in the case of employer/employee matching, companies and persons would alternate between the roles of subject and object. Note that in cases where an entity can assume different roles, a different profile would be created for each role.

Because the profiles are symmetric (both subjects and objects are profiled to the same representation), subjects can be matched to other subjects or objects, and objects can be matched to other objects or subjects. For example subject-subject matching could be used on a social networking site to connect people of like interests or on an online store to order product reviews according to the similarity of the reviewer to the reader. Similarly, object-object matching can be used to match keywords to products or content, advertisements to news articles, or promotional banners to referring affiliate sites.

Subjects and objects are represented as a set of derived abstract attributes, or feature vectors. In addition to driving the matching process, the distributions of the dimensions can be used to predict which items will evoke strong reactions (negative and positive) from a typical group of subjects and which items will evoke a more even response across those subjects.

The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over other collaborative filters is that it creates not just profiles of the subjects, but profiles of the objects as well. This provides several advantages, including rapid and scalable prediction of subject to object affinities; straightforward cross marketing across product categories; and sorting of objects by aesthetic categories for purposes of browsing and selecting items for consumption or association, such as selecting musical recordings to go with a movie production.

DETAILED DESCRIPTION OF THE DRAWINGS

Figure 1:
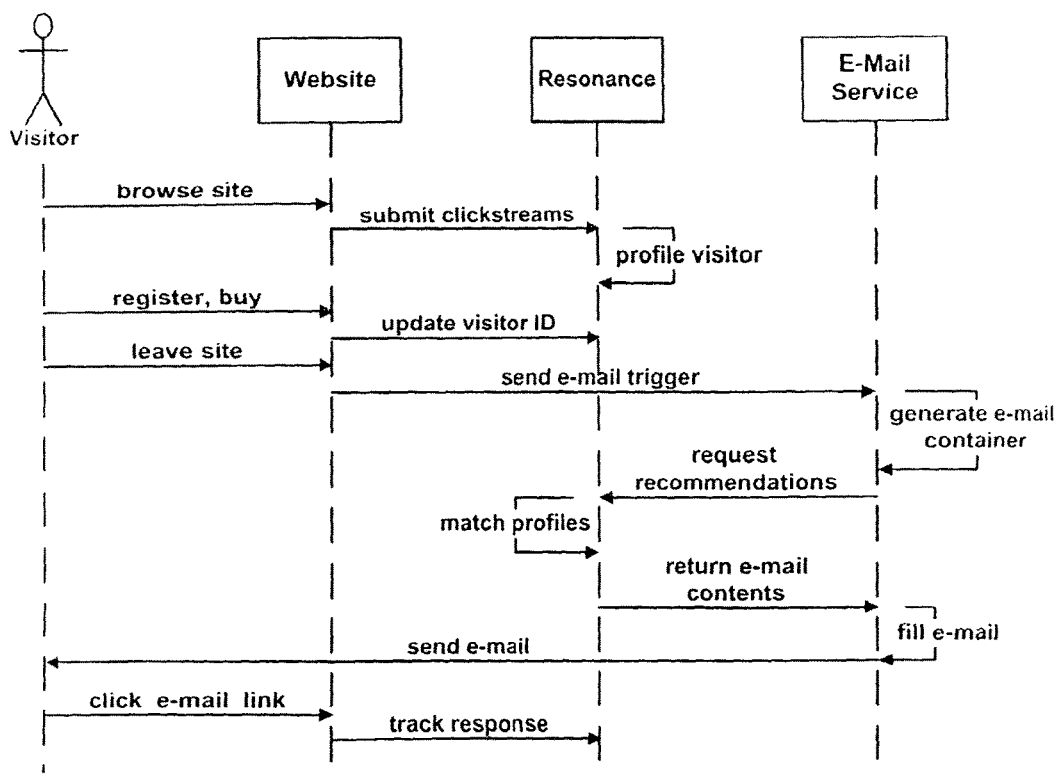
FIG. 1 shows the workflow to associate a web browsing identity with a known customer identity in order to generate targeted e-mails.

The following detailed description is related to the technology disclosed in U.S. patent application Ser. No. 12/415,758 filed on Mar. 31, 2009, U.S. patent application Ser. No. 12/416,005 filed on Mar. 31, 2009, and U.S. patent application Ser. No. 12/416,083 filed on Mar. 31, 2009, and all are incorporated by reference herein, in their entirety. FIG. 1 shows the workflow to associate a web browsing identity with a known customer identity in order to generate targeted e-mails. In this case there is a website that is using the Resonance profiling and targeting system, as described previously in U.S. patent application Ser. No. 12/415,758, U.S. patent application Ser. No. 12/416,005, and U.S. patent application Ser. No. 12/416,083, in conjunction with an electronic mail, or e-mail, service, which can be either internal to the website or managed by a third party e-mail service. When the visitor/subject browses the site, the Resonance web beacon creates and stores an anonymous user ID, or tracking ID, such as by using a browser cookie as described in U.S. patent application Ser. No. 12/415,758. The web beacon collects behavior data, as clickstreams, and submits it to the Resonance service with the tracking ID. The Resonance service uses this data to create the visitor's profile. At some point the visitor registers his or her e-mail address with the site, such as by purchasing a product from the site or signing up to receive an e-newsletter or e-mail promotions. Note that system can link e-mail address, tracking ID, customer ID, or other user ID as multiple identities of the same subject, including across multiple computers or other interface devices, provided that user identifies himself/herself. When this occurs the Resonance tracking ID can be associated with the user's e-mail address. When the visitor leaves the site, this may trigger the generation of a follow-up e-mail, according to the state in which the visitor departed, for example "no transaction initiated", "transaction abandoned", or "transaction completed". When this occurs the e-mail service fills a template with specific content targeted to that user by making a request to the Resonance service, which then looks up the visitor profile, matches it against the objects in the desired target catalog, and then returns the top-matching objects. The e-mail service retrieves any display information for the content to be displayed, and then sends the e-mail to the user. When the visitor responds to the e-mail by clicking the targeted content link generated by Resonance, then that response is tracked and the subsequent behavior is added to the visitor's profile.

Figure 2:
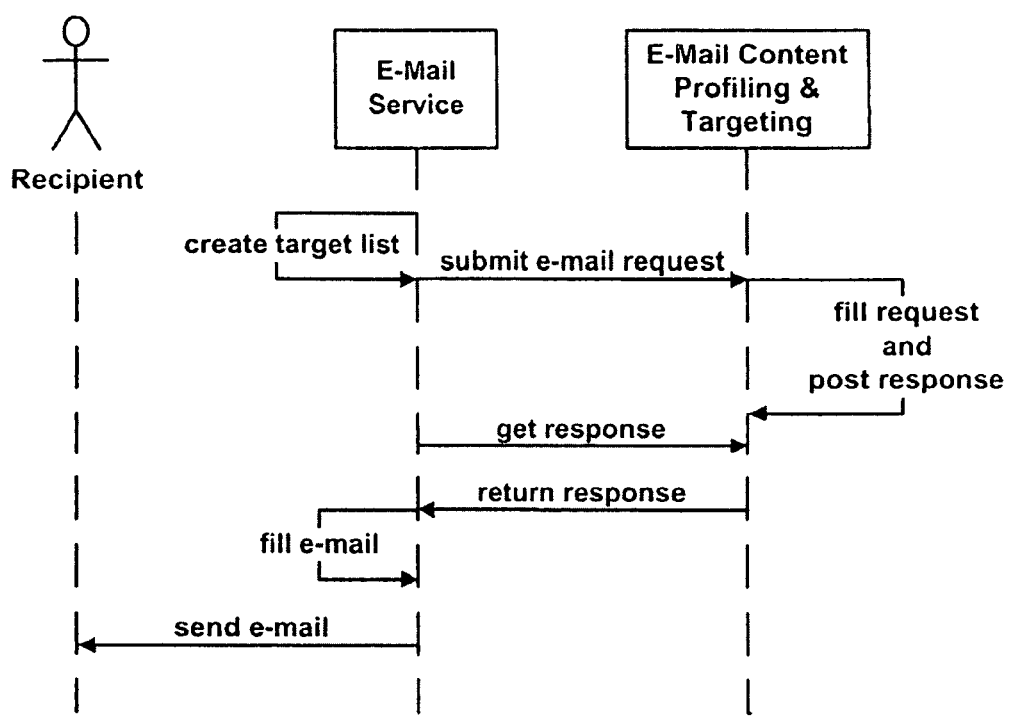
FIG. 2 shows the mechanism for requesting and delivering customized e-mail content.

FIG. 2 shows the mechanism for requesting and delivering customized e-mail content. An external e-mail service, either managed by the website or a third party, identifies a list of user customers to receive targeted e-mail. This list is submitted to the Resonance e-mail content profiling and targeting service, which retrieves the subject profiles of the target users, matches them against the object profiles of the desired content catalog, and then returns the top-matching items for each user, as described in U.S. patent application Ser. No. 12/415,758 filed on Mar. 31, 2009, U.S. patent application Ser. No. 12/416,005 filed on Mar. 31, 2009, and U.S. patent application Ser. No. 12/416,083 filed on Mar. 31, 2009. The data exchange between the e-mail service and the content profiling and targeting service can be by any electronic means, but most commonly would use web services or file transfer protocol (FTP). When the e-mail service receives the response from the targeting system, it takes the responses, fills an e-mail template with specific information for each user, and then sends the e-mails to the users.

Figure 3:
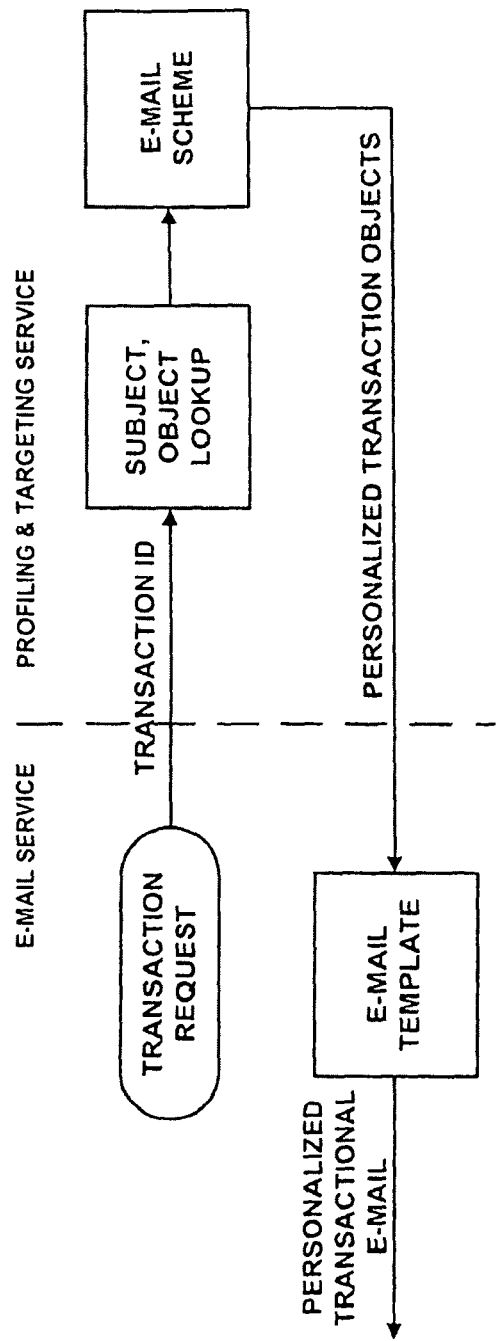
FIG. 3 shows an embodiment of a transactional e-mail system.

FIG. 3 shows an embodiment of a transactional e-mail system. Transactional e-mails are triggered in response to some action of the recipient, such as signing up for an electronic newsletter, purchasing a product via a website, call center, or catalog, or abandoning a transaction. Because transactional e-mails are usually generated one-at-a-time for a single user, they typically use web services to make the request and return the response. To generate a transactional e-mail, the e-mail service submits the transaction ID to the targeting service. The targeting service uses the transaction ID to look up previously captured information about the transaction, including the user subject that created the transaction and the items/objects involved in the transaction. The subject and object identifiers are submitted to the transactional e-mail scheme and the top-matching objects are returned to the e-mail service, using the system described previously in U.S. patent application Ser. No. 12/415,758 filed on Mar. 31, 2009, U.S. patent application Ser. No. 12/416,005 filed on Mar. 31, 2009, and U.S. patent application Ser. No. 12/416,083 filed on Mar. 31, 2009. The e-mail service then fills the e-mail template and sends the e-mail to the recipient.

Figure 4:
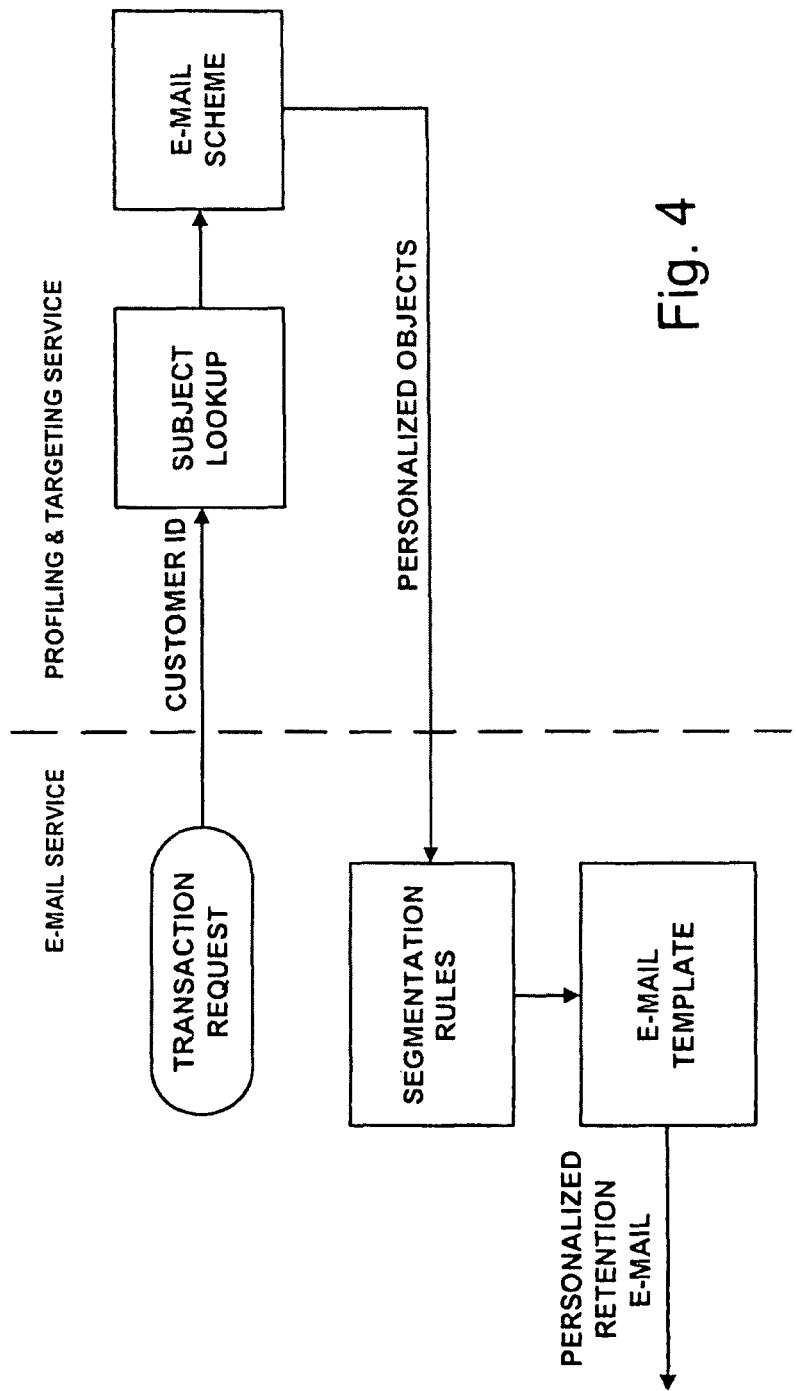
FIG. 4 shows an embodiment of a retention marketing e-mail system.

FIG. 4 shows an embodiment of a retention marketing e-mail system. In this case the e-mail would be sent to a set of recipients on a regular e-mail schedule, such as weekly or monthly. To generate the e-mails, the e-mail service sends the customer IDs to the targeting service, which looks up the subjects based on previous linking of e-mail addresses or customer IDs as described previously in FIG. 1. The subject profiles are processed through the retention marketing e-mail scheme, which generates targeted content for each requested recipient, using the system described previously in U.S. patent application Ser. No. 12/415,758 filed on Mar. 31, 2009, U.S. patent application Ser. No. 12/416,005 filed on Mar. 31, 2009, and U.S. patent application Ser. No. 12/416,083 filed on Mar. 31, 2009. These results may be further processed according demographic, psychographic, or other segmentation filters that have been defined by the e-mail service. Note that these filters could alternately be applied prior to sending the recipient list to the targeting service. The e-mail service takes the final results, fills the e-mail template, and sends the e-mails to the recipients.

Figure 5:
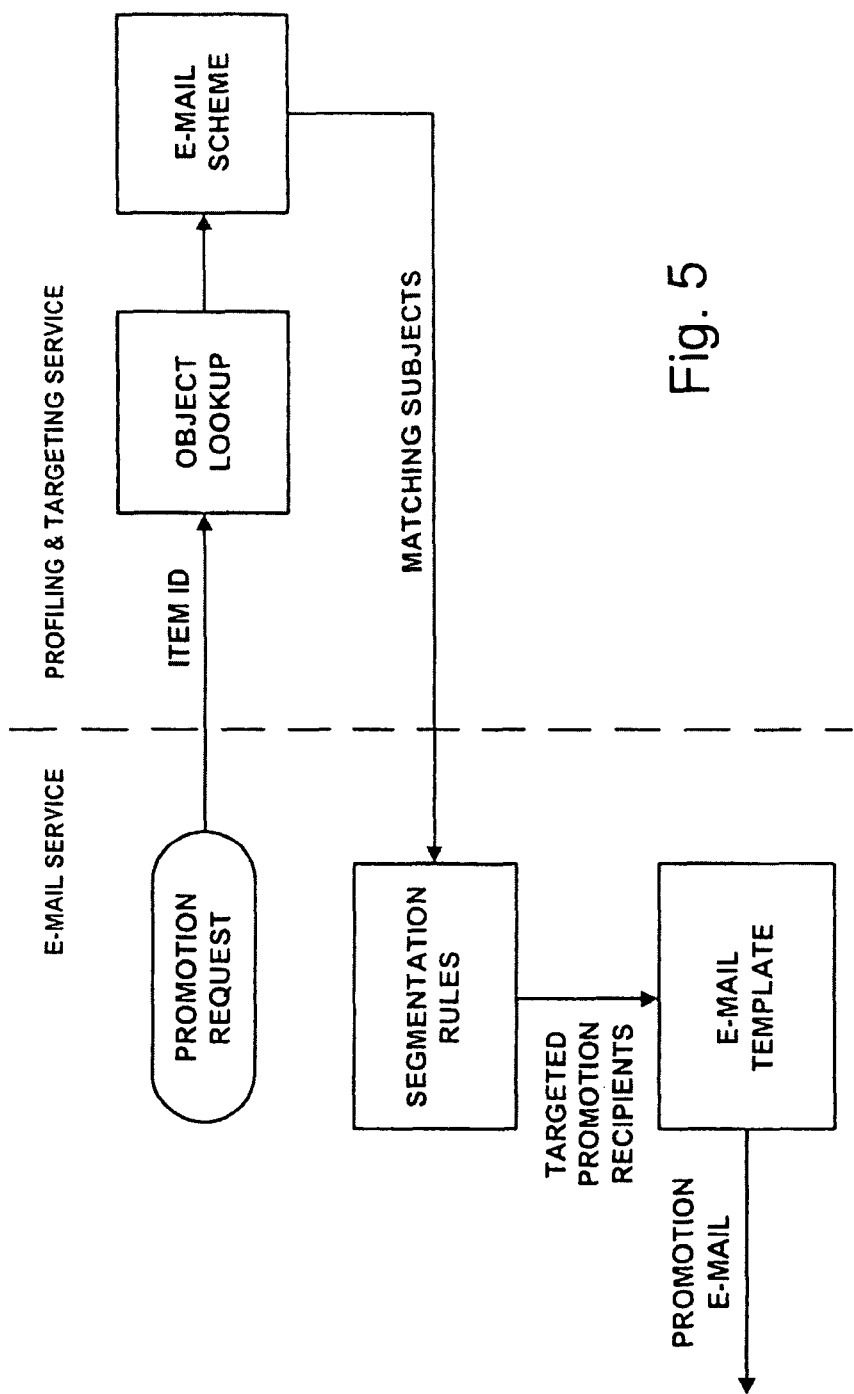
FIG. 5 shows an embodiment of a promotional e-mail system.

FIG. 5 shows an embodiment of a promotional e-mail system. In this case the e-mail would be sent to a set of recipients who are more likely to respond to the item being promoted. Limiting the number of recipients of the e-mail reduces the cost of the mailing and reduces the possibility of e-mail fatigue and possible opt-out on the part of the recipients. This embodiment relies on the symmetric nature of the Resonance profiling, as described previously in U.S. patent application Ser. No. 12/415,758 filed on Mar. 31, 2009, in particular that subjects can be matched to objects in the same way that objects are matched to subjects. To generate the e-mails, the e-mail service sends the promotional item ID to the targeting service, which looks up the corresponding object from the catalog's object lookup table, as described previously in U.S. patent application Ser. No. 12/415,758. The object profiles are processed through the promotional e-mail scheme, which finds the top-matching subjects for the promotional item, using the system described previously in U.S. patent application Ser. No. 12/415,758 filed on Mar. 31, 2009, U.S. patent application Ser. No. 12/416,005 filed on Mar. 31, 2009, and U.S. patent application Ser. No. 12/416,083 filed on Mar. 31, 2009. The user subject list is returned to the e-mail service, which may be further processed according demographic, psychographic, or other segmentation filters that have been defined by the e-mail service. The e-mail service takes the final results, fills the e-mail template, and sends the e-mails to the recipients.

The above application embodiments are for example only. The invention does not restrict the design and implementation of the application in any way, as long as the interface to the recommendation engine matches the protocols defined by the interface guidelines. A key aspect of the invention is that, unlike other methods, it targets the user based on the user's anonymous behavior within the application and does not in fact require knowledge of the user's age, residence, income, gender, and other personal factors to identify targeted content to send to the user.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A system for generating automated self-optimizing targeted e-mails, comprising:
   a recommendation computer system configured to receive user behavior data and a user identifier from a web site computer system configured to host a web site having a beacon embedded therein, said beacon being configured to create and store the user identifier, said web site being configured to accept an e-mail address supplied by said user;
   an object catalog stored in said recommendation computer system, each object of the object catalog having an object profile, said user profile and said object profile being in vector form to define an affinity therebetween according to the dot product between said user profile vector and said object profile vector;
   an e-mail service configured to receive one or more object descriptors to be inserted into an e-mail template, and generating a follow-up email for sending to said user, said one or more object descriptors being of objects having top-matching affinities with said user;
   wherein said recommendation computer system is further configured to track a response of the user to the follow-up email and generate a subsequent user behavior, comprising the tracked response, that is added to said user profile;
   wherein the recommendation computer system generates a tuned recommendation that is provided to the email service and is based on knowledge of past behavior of said user comprising the user profile and based on present behavior of said user comprising, the added subsequent user behavior.

2. The system for generating automated self-optimizing targeted e-mails, according to claim 1, wherein said web site computer system links anonymous identifiers generated by the web site computer system with application user identifiers associated with user e-mail addresses.

3. The system for generating automated self-optimizing targeted e-mails, according, to claim 1, wherein said recommendation computer system stores subject and object profiles that include subject and object profiles based on individual subject object behavior and aggregated subject object behavior.

4. The system for generating automated self-optimizing targeted e-mails, according to claim 1, wherein said subject and object profiles include subject and object vector profiles derived from collected behavior data of users, said subject and object vector profiles having an equal number of dimensions.

5. The system for generating automated self-optimizing targeted e-mails, according to claim 1, wherein said recommendations derived from said subject and object profiles are filtered by subject attribute segments.

6. The system for generating automated self-optimizing targeted e-mails, according to claim 1, wherein said targeted e-mails include transactional e-mails.

7. The system for generating automated self-optimizing targeted e-mails, according to claim 1, wherein said targeted e-mails include marketing retention e-mails.

8. The system for generating automated self-optimizing targeted e-mails, according to claim 1, wherein said targeted e-mails include promotional e-mails produced by matching the object profile vector of the item to be promoted to the subject profile vectors of a set of candidate recipients of the promotion and selecting top-matching subjects as e-mail recipients.

9. The system for generating automated self-optimizing targeted e-mails, according to claim 1, wherein said e-mail service is provided by said web site computer system.

10. The system for generating automated self-optimizing targeted e-mails, according to claim 1, wherein said email service includes file transfer protocol (FTP).

11. The system for generating automated self-optimizing targeted e-mails, according to claim 1, further comprising optimization of measured e-mail response, said optimization comprising opening an email, clicking on a recommendation presented in the e-mail, and subsequent conversion of destination action configured in the e-mail.

12. A method for generating automated self-optimizing targeted e-mails, comprising, the steps of:
   (a) collecting user behavior data and providing recommendations to said user at a web site computer system configured to host a web site having a beacon embedded therein, said beacon being configured to create and store a user identifier, said web site being configured to accept an e-mail address supplied by said user;
   (b) receiving said user behavior data and said user identifier from said beacon of the web site computer system at a recommendation computer system and creating a user profile at said recommendation computer system, said recommendation computer system being further configured to receive said e-mail address from said web site computer system when provided by said user;
   (c) storing an object catalog in said recommendation computer system, each object of the object catalog having an object profile, said user profile and said object profile being in vector form to define an affinity therebetween according to the dot product between said user profile vector and said object profile vector;
   (d) integrating recommendations into an e-mail service configured to receive one or more object descriptors to be inserted into an e-mail template, and generating a follow-up email for sending to said user, said one or more object descriptors being of objects having top-matching affinities with said user;
   (e) tracking a response of the user to the follow-up email and generating subsequent user behavior, comprising the tracked response, that is added to said user profile at said recommendation computer system; and
   (f) generating a tuned recommendation at the recommendation computer system;
   wherein the tuned recommendation is provided to the email service and is generated by the second computer system based on knowledge of past behavior of said user comprising the user profile and based on present behavior of said user comprising the added subsequent behavior.

13. The method for generating automated self-optimizing targeted e-mails, according to claim 12, wherein said step of collecting user behavior data providing recommendations includes linking anonymous identifiers generated by the web site computer system with application user identifiers associated with user e-mail addresses.

14. The method for generating automated self-optimizing targeted e-mails, according to claim 12, further comprising the step of providing subject and object profiles at the recommendation computer system, wherein said subject and object profiles include subject and object profiles based on individual subject object behavior and aggregated subject object behavior.

15. The method for generating automated self-optimizing targeted e-mails, according to claim 12, wherein said subject and object vector profiles are based on collected behavior data of users, said subject and object vector profiles having an equal number of dimensions.

16. The method for generating automated self-optimizing targeted e-mails, according to claim 12, wherein collecting user behavior data and providing recommendations further includes the step of providing recommendations derived from said subject and object profiles wherein said recommendations derived from said subject and object profiles are filtered by subject attribute segments.

17. The method for generating automated self-optimizing targeted e-mails, according to claim 12, wherein said step of measuring response of user e-mail recipients to targeted e-mails includes the step of measuring response of user e-mail recipients to targeted e-mails wherein said targeted e-mails include one or more of transactional e-mails or marketing retention e-mails.

18. The method for generating automated self-optimizing targeted e-mails, according to claim 12, wherein said step of measuring response of user e-mail recipients to targeted e-mails includes the step of measuring response of user e-mail recipients to targeted e-mails wherein said targeted e-mails include promotional e-mails produced by matching the object profile vector of the item to be promoted to the subject profile vectors of a set of candidate recipients of the promotion and selecting top-matching subjects as e-mail recipients.

19. The method for generating automated self-optimizing targeted e-mails, according to claim 12, wherein said e-mail service is internal to said web site, and further wherein said email service includes file transfer protocol (FTP).

20. The method for generating automated self-optimizing targeted e-mails, according to claim 12, wherein said step of tuning recommendations based on measured response includes the step of tuning recommendations based on measured response wherein said measured response includes opening an e-mail, clicking on a recommendation presented in the e-mail, and subsequent conversion of a destination action configured in the e-mail.

21. A method for generating automated self-optimizing targeted e-mails, according to claim 12, further comprising the steps of:

providing a cross-referencing system-generated ID of said user with email service ID and e-mail address data of said user at the recommendation computer system;

wherein the recommendation computer system generates a tuned recommendation that is provided to the email service and said tuned recommendation is based on knowledge of past behavior of said user, comprising the user profile, and is based on present behavior of said user, comprising the subsequent user behavior.

22. The method for generating automated self-optimizing targeted e-mails, according to claim 12, wherein the sent email comprises a retention marketing e-mail to a customer with suggestions of additional products to purchase based on past purchases and other recorded user behavior.

23. The system for generating automated self-optimizing targeted e-mails, according to claim 1, wherein said e-mail service is provided by an email computer system external to said web site computer system.

* * * * *